Figure 1:
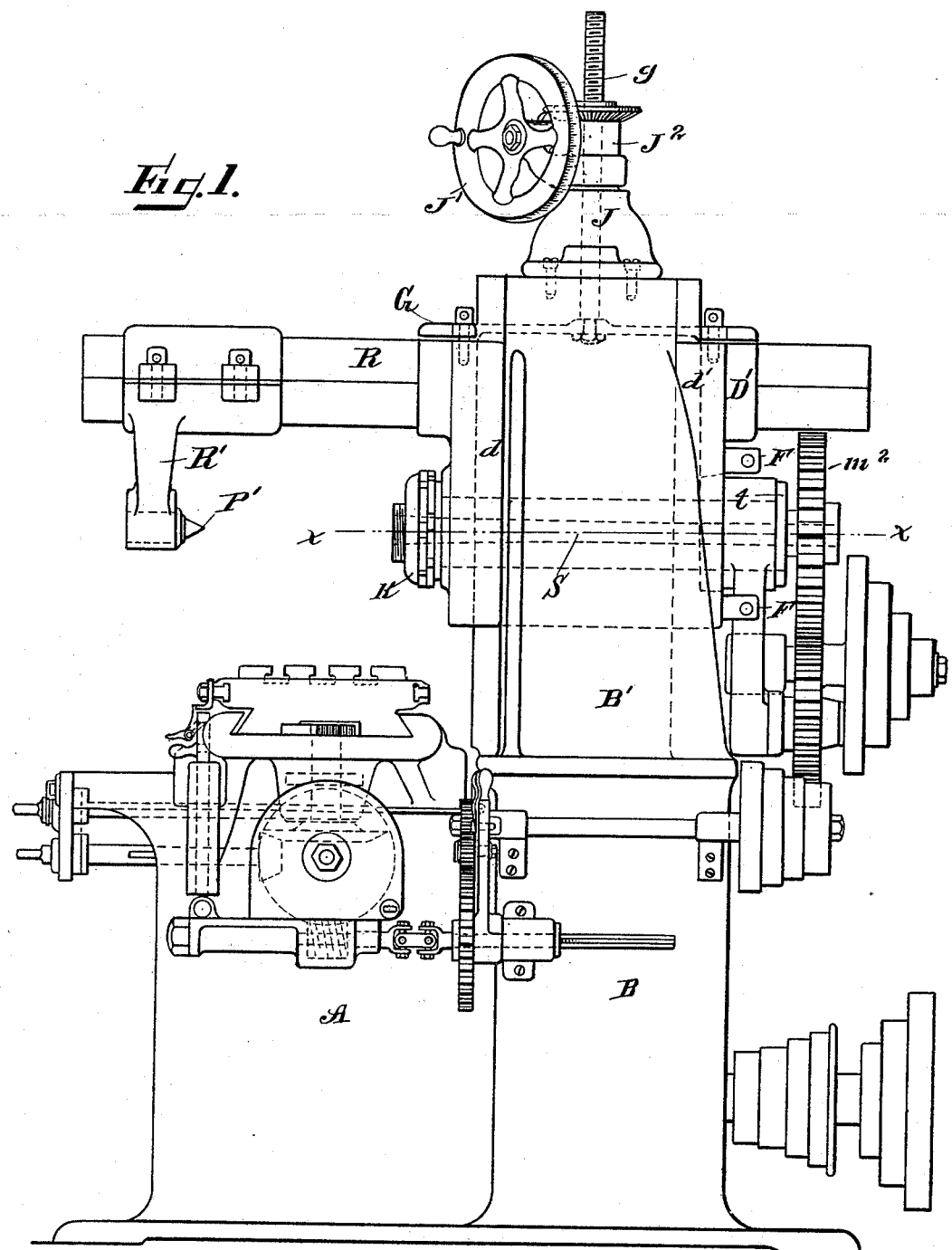

(No Model.) 7 Sheets—Sheet 1.

C. H. NORTON.
MILLING MACHINE.

No. 509,444. Patented Nov. 28, 1893.

WITNESSES
F. Clough
J. W. Bradford

INVENTOR
Charles H. Norton
by Parker W Burton
Attorneys.

THE NATIONAL LITHOGRAPHING COMPANY.
WASHINGTON, D. C.

(No Model.)
7 Sheets—Sheet 2.

C. H. NORTON.
MILLING MACHINE.

No. 509,444. Patented Nov. 28, 1893.

WITNESSES
F. Clough
J. W. Bradford

INVENTOR
Charles H. Norton
by Parker & Burton
Attorneys.

(No Model.)
7 Sheets—Sheet 4.

C. H. NORTON.
MILLING MACHINE.

No. 509,444. Patented Nov. 28, 1893.

WITNESSES
H. Clough.
W. W. Bradford

INVENTOR
Charles H. Norton
by Parker & Burton
Attorneys.

(No Model.)

C. H. NORTON.
MILLING MACHINE.

No. 509,444. Patented Nov. 28, 1893.

WITNESSES
F. Clough.
J. K. Bradford

INVENTOR
Charles H. Norton
by Parker & Burton
Attorneys.

(No Model.) 7 Sheets—Sheet 6.

C. H. NORTON.
MILLING MACHINE.

No. 509,444. Patented Nov. 28, 1893.

WITNESSES
F. Clough.
D. W. Bradford

INVENTOR
Charles H. Norton
by Parker & Burton
Attorneys.

(No Model.)  7 Sheets—Sheet 7.

C. H. NORTON.
MILLING MACHINE.

No. 509,444.  Patented Nov. 28, 1893.

WITNESSES
F. Clough,
T. W. Bradford

INVENTOR
Charles H. Norton
by Parker & Burton
Attorneys.

THE NATIONAL LITHOGRAPHING COMPANY,
WASHINGTON, D. C.

UNITED STATES PATENT OFFICE.

CHARLES H. NORTON, OF DETROIT, MICHIGAN, ASSIGNOR TO THE LELAND, FAULCONER & NORTON COMPANY, OF SAME PLACE.

MILLING-MACHINE.

SPECIFICATION forming part of Letters Patent No. 509,444, dated November 28, 1893.

Application filed January 28, 1893. Serial No. 460,009. (No model.)

*To all whom it may concern:*

Be it known that I, CHARLES H. NORTON, a citizen of the United States, residing at Detroit, county of Wayne, State of Michigan, have invented a certain new and useful Improvement in Milling-Machines; and I declare the following to be a full, clear, and exact description of the invention, such as will enable others skilled in the art to which it pertains to make and use the same, reference being had to the accompanying drawings, which form a part of this specification.

This invention relates to milling machines, and has for its object the production of a milling machine, which shall be adapted to various classes of work, and which shall furnish exceedingly firm and stable supports for both the work and the milling cutter, while at the same time the relative position of the platen, [or work table] the platen carriage and cutter, may be changed quickly and accurately as to amount of change without destroying the accuracy of alignment or of angle which existed in the original position of these parts.

Machines for doing milling work may be divided into three classes. First. Machines in which the platen, [or work table] is supported by and travels upon ways which form a solid part of the base or column of the machine; this base rests upon the floor directly under the platen, and usually extends under the entire length of the platen; the cutter-spindle is carried by bearings at each end, and these bearings are supported by uprights which spring from projections on the base on either side of the platen. The cutter spindle is raised and lowered by mechanical means, of which there are several varieties differing in details. They all however cause the bearing supports to slide up and down on the upright. The milling cutter is fast to the spindle, and can be placed in any desired position between the bearings. This class of machines is limited in its capacity, and is especially adapted for long and large work and is useful when a large number of duplicate pieces are required; because of the necessary clumsiness of adjustment, and because it is nearly if not quite impossible, to preserve the necessary accuracy of alignment of the cutter-arbor as related to the platen, and consequently it is impracticable to use this class of machine where frequent changes of work are made and where great accuracy is required.

Figure 7:
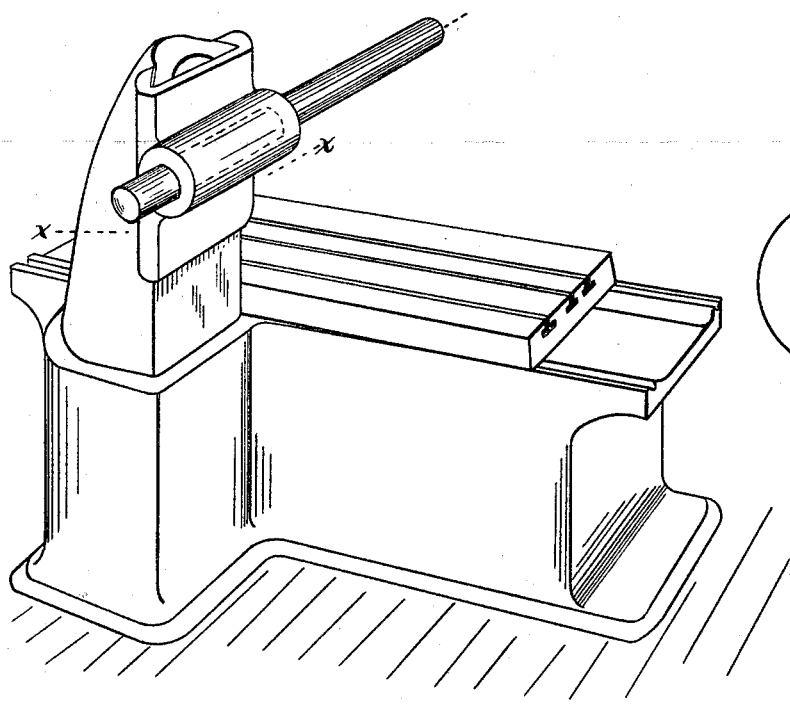
Figure 8:
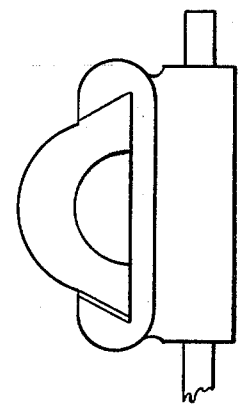

A second class comprises machines in which the platen is supported by, and moves on a base, similar to that used in the first class; but the cutter-spindle is mounted in a carriage which is supported on one upright that springs from a projection of the base at one side of the platen. This class of machines is limited in its capacity for the reason, that the horizontal adjustment of the cutter is very limited, as any considerable adjustment causes a lack of rigidity of the cutter-spindle carriage or upright; and this class of machine has never been used for anything but large and special work. The finer and more complicated milling work has never been successfully accomplished by it. The cutter-spindle and its bearings and uprights are weak relatively to the platen and its base or support. A machine of this class is shown in Figs. 7 and 8, and from those figures it will be seen that the cutter-spindle bearing slide [which may be raised and lowered by any one of several means] is held to the track or way, by a common gib by which lost motion is taken up as the slide wears. There are two elements of weakness in this form of support. First, because any lost motion or looseness between the bearing parts is magnified at the point where the cutter does its work, owing to the fact that under the working strain, the motion is not at right angles to the bearing surfaces upon which the carriage travels. The cutter-head is at the end of what may be regarded as a long lever, and consequently travels through a considerable space, if there is any yielding or giving, between the carriage and its track. Second, the carriage-travels on a support, with which it is connected by three bearing faces, two of which stand at angles to the third. The gib is inserted along one of the angled bearing surfaces, while the cutter spindle is parallel to the main bearing surface. The machine depends for its accuracy, upon the accurate fit of the gib, and should this become loose, the looseness is magnified, by an amount depending on the angle at which the one bearing face stands to the other. Thus if $x$, equal the amount of wear and, $y$, equal the angular divergence the amount of play given to the spindle-carriage, will be $x$, divided by the cosine of $y$.

Figure 9:
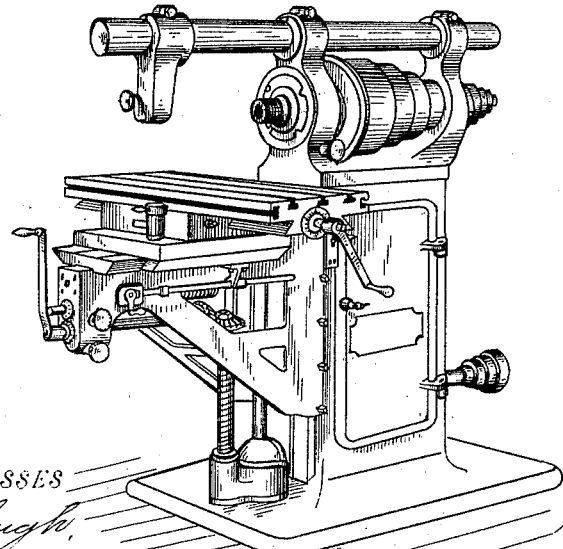

The third class of milling machines, comprises those in which the cutter-spindle is supported by two upright posts or housings which extend upward from a base or column, upon the front side of which, is adjustably secured a knee or bracket. This knee is adjustable vertically by means of a screw. The knee supports a horizontal platen which is adjustable toward and away from the uprights that support the spindle; and upon this platen is supported a second platen which is adjustable horizontally at right angles to the first adjustment. The two adjustments thus enable that work to be carried horizontally to any plane within the limits of the travel of the platens, and the vertical acting screw enables the workman to lift or lower the work. A machine of this class is shown in Fig. 9. In this class we have great convenience of adjustment, and wide range of capacity, and can do very small work as well as large work up to the capacity of the machine in breadth and height. But this class of machine has been found inadequate when very large and heavy machines were required, because the work-platen which rests upon the knee is necessarily weak in proportion to the support of the cutter-spindle, and there is also found to be a lack of accuracy owing to the fact that the heavy platen, platen-carriage and work are constantly changing their position relatively to the points of support of the knee; the entire mass hangs on the bracket support and the weight is changed from one position to another, and causes a spring of the knee, and a motion at the vertical sliding joint by which the knee is held to the upright, and the insecure foundation also produces a spring or yielding between the slides of the platen-carriage.

Thus in the first class in which are found a solid support for the platen, and solid supports for the cutter-spindle, there is the difficulty, that they are clumsy to operate and limited in capacity.

In the second class there is a solid support for the platen but a weak support for the cutter-spindle, the capacity is limited and the machine is liable to do inaccurate work.

In the third class, the support for the platen is weak and changeable; the support for the cutter-spindle is firm, the machine is conveniently and rapidly handled, and the range of work is wide, but the machine is liable to do inaccurate work.

It is the object of the present invention to furnish a firm support for the platen, which shall have a wide range of adjustment horizontally in both directions, to furnish a firm support for the cutter-spindle, having all the convenience of rapid and easy adjustment, of the third class without the corresponding weakness or inaccuracy of either the second or third class.

The present demands of machine and tool work make it necessary to do work with very great accuracy, so much so that it is sometimes necessary to mill the surfaces of plates or other pieces so accurately that there shall not be a variation of one quarter of one-thousandth of an inch from true parallelism between the planes on the opposite sides of the plates, and in doing such work, it is frequently necessary to change the relative position of the work and the cutter during the progress of the work, and consequently the movable parts must be arranged to travel with very great accuracy, and to be adjusted with great delicacy, and the various parts of the machine must be made of great strength, and rigidly secured so as not to give or spring during the work in order that the surface of the work may be smooth and without "chatter marks." With all this the machine must be so constructed that it may work rapidly and cut deeply. I am convinced by my experience with the three classes of machines spoken of, that it is desirable to support the platen or work table upon a base or column which rests upon the floor directly under the platen, and I think my experience agrees with that of other designers. Also in order to construct a machine which is convenient it is necessary that the cutter-spindle be raised and lowered upon an upright that is located at one side of the machine, and that the other side of the machine be left open for the convenience of operation, and to prevent the inaccuracy or cramping caused by the spanning over the platen to a second support on the other side. The well known form shown in Fig. 7, has been deemed by designers as the best one. But in all cases that I have ever known the form of supporting the cutter-spindle there shown, has proven too weak as compared to the platen and its support.

Another feature of importance in my invention is found in the arm which supports the outer end of the cutter-spindle. In both the second and third classes of milling machines spoken of above, there is often found a heavy bar or arm reaching through the upper part of the spindle carriage, or, in class three, through the upper part of the upright posts which support the spindle. This arm is intended to be parallel with the axis of the cutter-spindle, and upon the outer end of it is carried a supporting center, the object of which is to sustain, the outer end of the cutter-arbor. This arm is adjustable in and out, is round in cross section, and slides in a round hole; it should be parallel with the axis of the cutter-spindle, and retain its true parallelism within a limit of one-thousandth of an inch or less, measured at the end of the bar when clear out (or an error of less than one-thousandth in the entire length). It is practically impossible to obtain this degree of accuracy in the first instance, or to retain it afterward when the round arm is used, inasmuch as the round shape does not allow of correcting by hand scraping after the hole is bored and the arm is turned to slide into the hole; and while the round arm can be fitted so as to move tightly in the hole, and the walls can be split and clamped tightly on the arm, yet the entire surface of the arm cannot be made to bear directly throughout its entire surface, upon the clamping surface surrounding it; this can readily be discerned after the arm has been moved a few times backward and forward through the hole. Some parts of the arm or of the walls of the hole, will indicate that there was contact between the parts while other parts will indicate that there was not a contact, and if there be any attempt to scrape off the parts showing contact, which of course are the more prominent parts, a looseness is produced, the same as that produced by an attempt to correct the alignment of the arm. By my invention I aim to provide an arm and a holder for the same, of such a form that I can correct at any time an error of alignment or an imperfection of surface contact. The first result is necessary in order that the work done may measure correctly; the second result is necessary in order that the contact between the bar and the frame that surrounds it may be as rigid as though they were solid metal, so that there shall be no "chatter" or trembling of the bar. It is not enough to hold the bar firmly to prevent vibration or "chatter" but it is necessary that the contact between the two pieces be so perfect that the vibration of one, shall be entirely absorbed, by the other or larger mass of metal. This perfection of surface contact between the two pieces is made possible throughout the entire length of the bar in the bearings, as the bar can be scraped to perfectly straight and true sides before fitting the square hole to it, and then by hand scraping upon one or the other of the sides of the support in which the bar rests; the alignment of the bar can be made extremely accurate. The same remarks are applicable to the forming and fitting of the hanger which supports the center.

The features of improvement, I produce by the mechanism shown in the nine following figures, in which—

Figure 2:
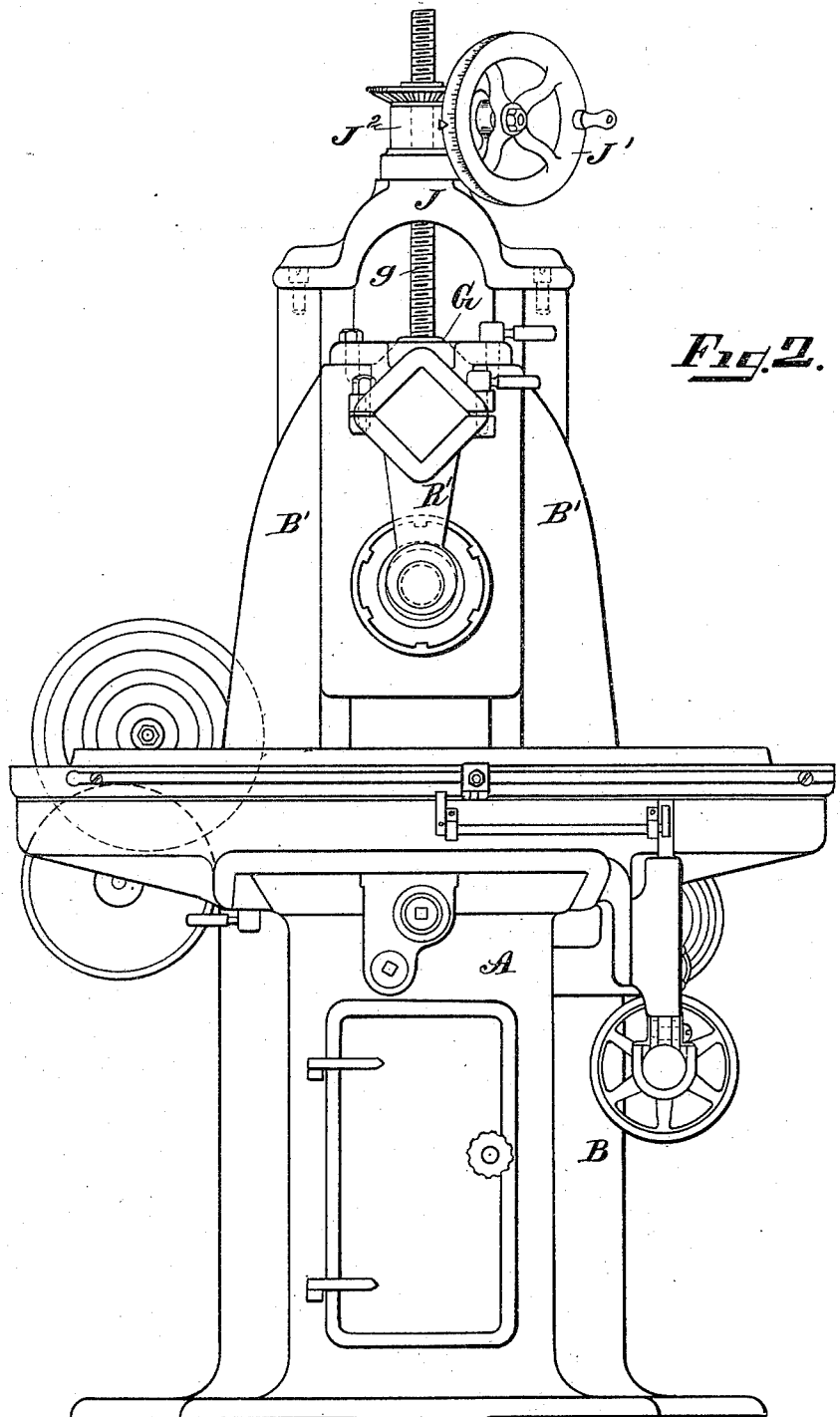
Figure 3:
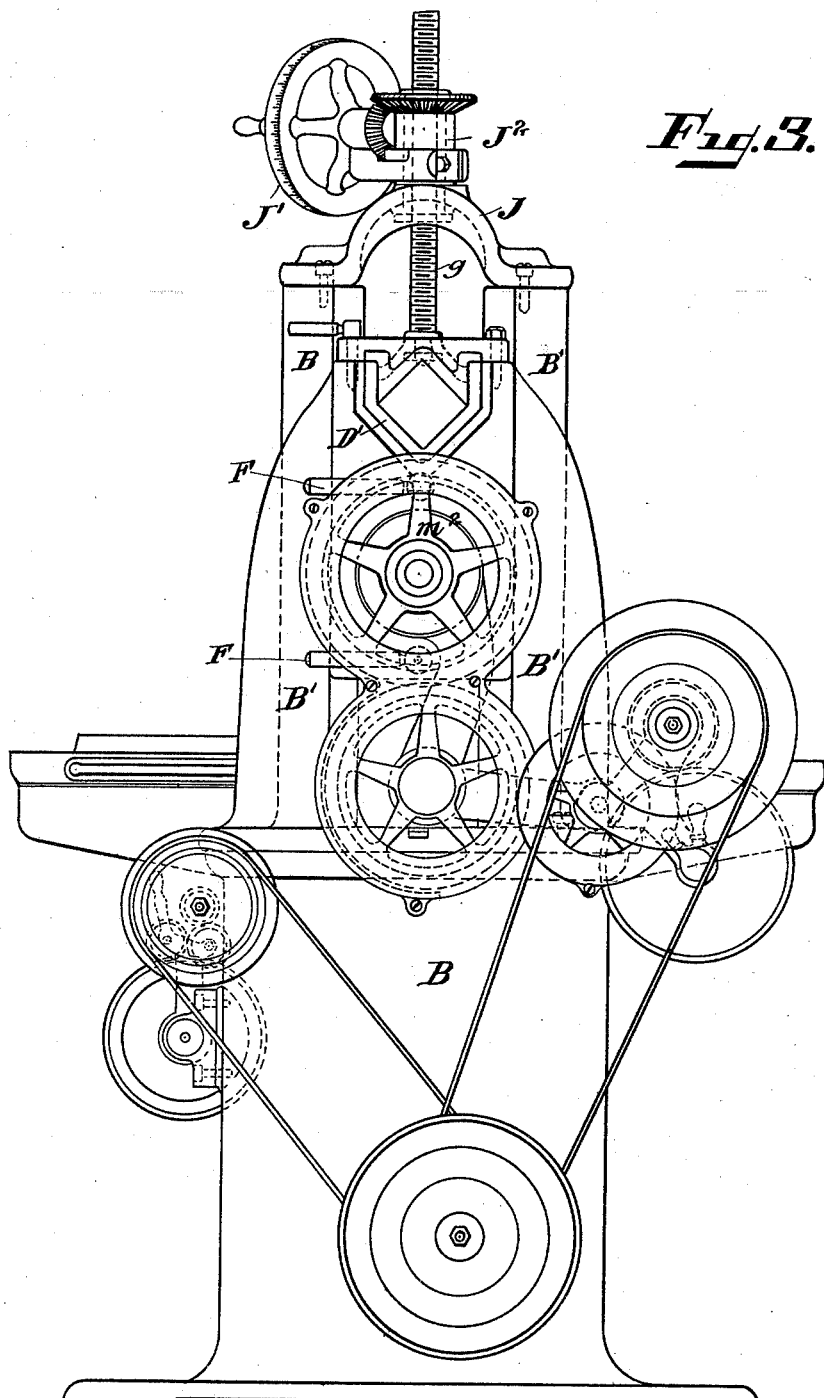
Figure 4:
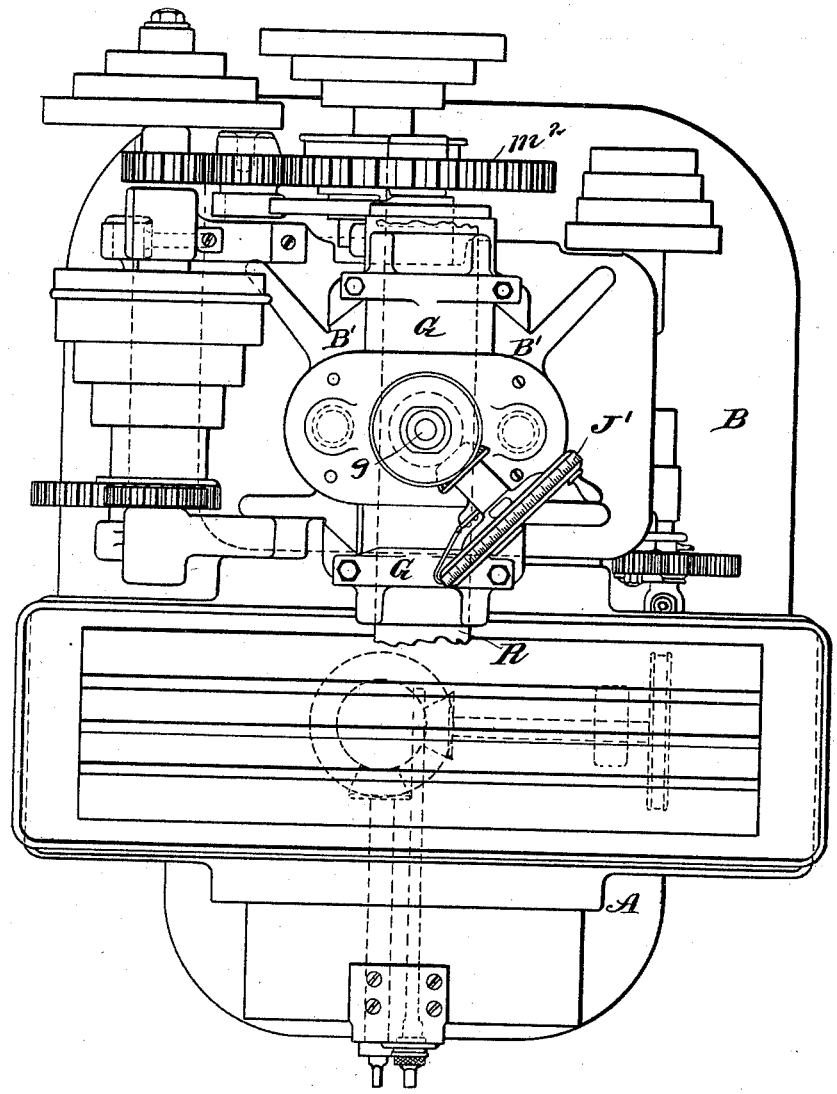
Figure 5:
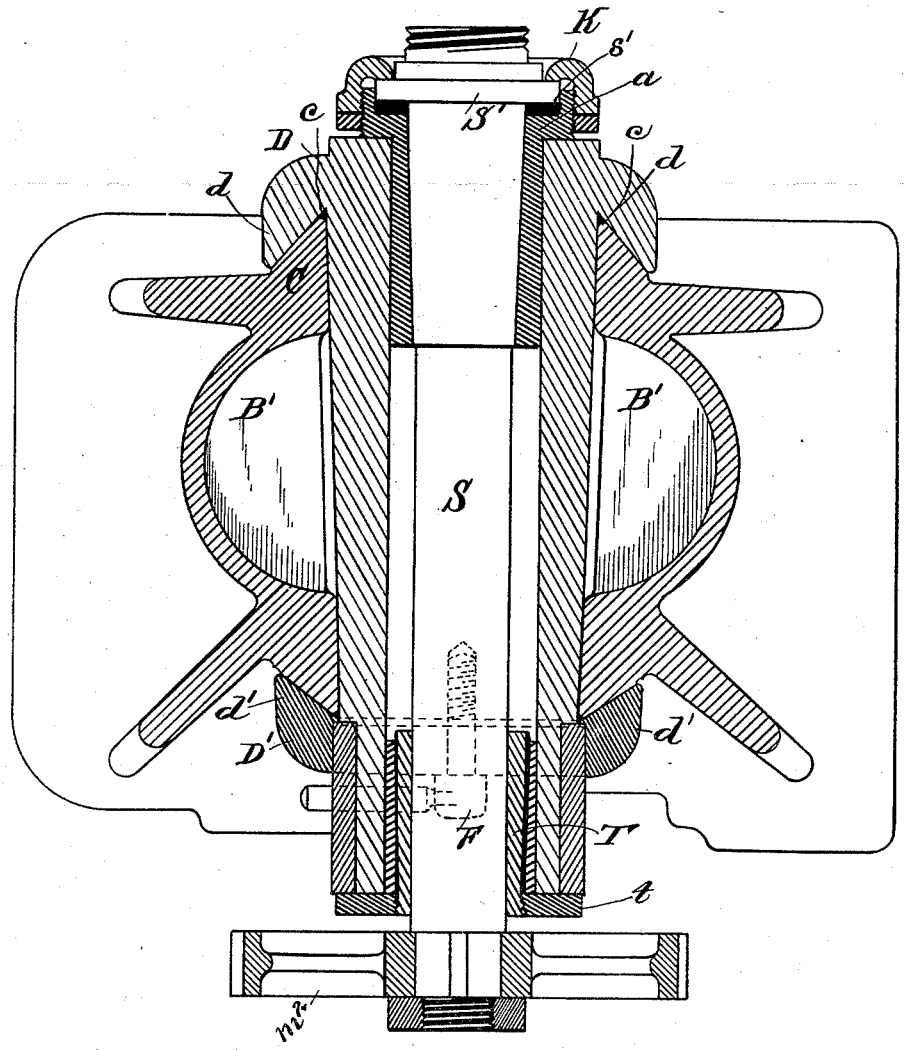
Figure 6:
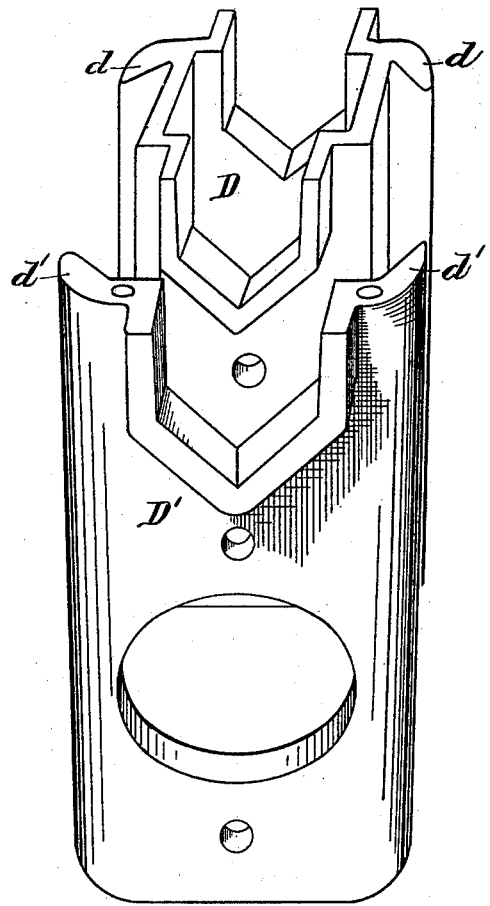

Figure 1, is a side elevation of my milling machine. Fig. 2, is a front elevation. Fig. 3, is a rear elevation. Fig. 4, is a plan view. Fig. 5, is a horizontal cross section, at the line $x\ x$ of Fig. 1. Fig. 6, shows in perspective some parts of the vertical carriage which support the cutter-spindle. Fig. 7, indicates the manner of supporting the cutter-spindle on a sliding head or carriage which travels on a post that rises from the side of the work supporting base. Fig. 8, is a cross section at the line $x\ x$ of Fig. 7. Fig. 9, shows the class in which the work table is adjustable and the cutter head is held in supports that are secured to the base.

A, B, indicate the main framework, comprising the bed-plate A, which supports the platen, and the pillars B, B', which support and hold the movable carriage D, D'; the bed-plate and the movable platens by which the horizontal location of the work to be treated may be changed, do not differ greatly from the bed-plate and platens of the second class of milling machines hereinbefore referred to; to the rear of the pillar B, are secured various driving wheels, which are connected through proper gearing or belting in any of the well known ways, with the gear $m^2$, that is fixed to the spindle of the cutter, and through other suitable gearing with the pinions which move the platens. While there are several varieties of gearing differing in details, used in machines of this kind, they all involve practically the same principles, and as my invention does not relate to these features at all, and as they are all well known to mechanics, I do not deem it necessary to enter upon a detailed explanation of the mechanism which may be employed for this purpose, but will pass directly to a description of those features of my invention which I deem to be new.

The means for adjustably securing the vertical carriage in its track can be best understood from an examination of Fig. 5, in connection with the front and side elevations shown in Figs. 1 and 2. At the back of the bed-plate upon which the platens rest, rise two vertical ways B', B', the inner opposing faces of which are not parallel with each other, but are closer together at one side than at the other, being preferably closer together at the rear than at the front; the faces rise perpendicular to the base, and their vertical lines are parallel while their horizontal lines from front to rear form the two converging sides of a trapezoid, so that the space or opening between the ways assumes the shape of a wedge with the thin end cut off leaving it truncated as it may be called. Between the front and the back on each side the middle portion of the pillar is hollowed out or cut away, leaving a bearing surface at front and a bearing surface at the rear, so that there are four bearing surfaces between the pillars for the support of the carriage D. There are also four bearing surfaces on the outside of the pillars B', two of which are engaged by the overhanging ends $d$, of the carriage, and two of which are engaged by corresponding overhanging ends $d'$, of the face-plate D', which secures the carriage in place on the pillars. The external portion of the bearing surface, lies at an angle to the internal surface or the surface between the pillars, and they would meet at an angle, except that the extreme edges $c$, are cut away to permit the complete engagement of both surfaces of the way C, with the carriage and with the overhanging lip of the face-plate. At the junction between the body part of the carriage D, and the face-plate D', there is left a slight space, enough only however, to insure that the body part of the carriage will be drawn by the holding screws F, F, into complete engagement with the ways upon which the carriage travels. In case of the wearing away of any of the engaging faces, the peculiar angular shape of the engaging parts enables me to bring them all into engagement again, by simply turning the screws F, F, so as to draw closer together the body part D, of the carriage and the face-plate D', and if it becomes necessary to scrape off the face of the body part D, that can be done without renewing any of the other parts or changing them in any way, thus enabling me to dispense entirely with the gib, which is usually found necessary when the carriage rides on a spreading or dovetail track. It will also be noticed that if there is any too much wear at any one of the eight bearing surfaces, some one or more of the remaining bearing surfaces at once take the burden of carrying the carriage, so that there is no liability of loose contact between the carriage and the ways consequent upon long continued use; on the contrary, the longer the use the more intimate will be the contact between all the surfaces.

The sliding carriage D, and the face-plate D', are traversed from front to rear by the spindle S, the front end of which is slightly tapered or coned, and is carried in a bushing $a$, [preferably made of phosphor-bronze.] A collar S', is secured to the spindle, and between the collar and the end of the bronze bushing is a ring $s'$, preferably of "Babbitt metal." A cap K, provided with an inturned flange is screwed to the bronze-bushing; the flange aids in protecting the parts from dust, and aids in holding the spindle in place. At the rear end of the spindle is a cylindrical bushing T, and a nut $t$. Above the spindle and parallel with it is a seat for the arm R. This consists of two Y-shaped bearings, one at the front and the other at the rear, of the main or body part of the carriage D; the front bearing projects through the face-plate D', so that no part of the arm R, rests upon any part of the face-plate. The arm R, is square in cross section and rests in the Y's just spoken of. The arm is made straight in the first instance on its four sides by tooling it, and by rubbing three similar arms together, and working them until the four sides are as accurately straight from end to end as it is possible to make them. The Y's are made in the first instance as nearly parallel with the axis of the cutter-spindle as possible, and it is possible to finish them with great accuracy, because either one of the four surfaces which compose them can be treated to bring the bearing of the arm into accurate alignment. Above the arm R, is a saddle piece G, which is bolted to the main or body part of the carriage D, and is held by its securing bolts against the arm R, and holds the arm R, in the Y's, which support it. To the upper part of the saddle is secured a screw $g$, which passes up through the irons J, that reach from one to the other of the upright ways, and the screw $g$, is fitted with a nut $j$, which is operated by a vertical hand wheel J', and bevel gearing $J^2$. The hand wheel J', is graduated, and by its use I am enabled to set the elevation of the spindle at a definite distance above the bed of the table, and to reset it again at the same elevation if desired. At the other end of the arm R, is a hanger R', made in two pieces, the under one of which supports a conical center P'; the point of which is in the axis of the cutter-spindle, and is accurately placed in axial alignment by treating the under and upper parts of the hanger in the same way that the Y's of the carriage were treated. It will be seen that this form of carriage is adapted to hold the movable head, not only of heavy milling machines but of any class of metal working machines, in which the cutting tool is to be held from a support, that is entirely at one side of the work to be dealt with, and thus it is applicable to open side milling machines, planers, shapers, and other metal working machines of similar character.

Having thus explained my invention, what I claim is—

1. In a metal working machine, the combination with a work supporting platen, a pair of vertical posts, having their opposed faces perpendicular to the plane of said platen, but placed at an angle to each other, a wedge shaped carriage, adapted to slide vertically between said posts, means for holding said carriage against horizontal motion, and means for giving to said carriage vertical motion, substantially as and for the purpose described.

2. In combination with the vertical posts of a metal working machine, having vertical bearing faces parallel in their vertical lines, and converging in horizontal lines, a carriage having parallel vertical sides converging in horizontal lines, and means for drawing said carriage horizontally into close engagement with said vertical posts, substantially as and for the purpose specified.

3. In combination with a supporting frame work, a horizontal cutter spindle, a supporting arm parallel thereto, square in cross section and having one of its diagonal diameters in the plane passing through the axis of said cutter spindle, right angled Y-shaped arms having their angle in said plane and adapted to support said horizontal arm, substantially as and for the purpose specified.

4. In combination with a cutter spindle and a frame supporting the same, a pair of Y-shaped arm supports, a clamping saddle a square arm adapted to be held between the saddle and the arm supports the diagonal diameter of said square arm being in the plane passing through the axis of said cutter spindle, substantially as and for the purpose specified.

5. In combination with a cutter spindle and a frame supporting the same a Y-shaped supporting bearing, a sliding arm square in cross section, the angle of said Y-shaped supporting bearing being in the plane passing through the axis of the cutter spindle and the axis of the sliding arm, means for clamping the arm in its bearings and a center supporting hanger provided with Y-shaped bearings and clamps, substantially as and for the purpose specified.

6. In a metal working machine, the combination with two vertical ways, each of which is dovetailed in horizontal cross section, and opposing faces of which present converging horizontal lines between the front and rear, a truncated wedge shaped carriage, with overhanging clamping edges at the larger end, a securing plate adapted to be attached to said carriage, and to present in conjunction therewith, similar overhanging clamping edges at the smaller end, and means for securing the parts together, substantially as and for the purpose specified.

In testimony whereof I sign this specification in the presence of two witnesses.

CHARLES H. NORTON.

Witnesses:
 EFFIE I. CROFT,
 CHARLES F. BURTON.